United States Patent [19]
Frank

[11] Patent Number: 6,163,798
[45] Date of Patent: *Dec. 19, 2000

[54] MULTI-HEAD VIDEO TELECONFERENCING STATION

[75] Inventor: David Frank, Delray Beach, Fla.

[73] Assignee: Fuzion Technologies, Inc., Boca Raton, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/711,603

[22] Filed: Sep. 10, 1996

[51] Int. Cl.[7] ................................................ G06F 13/00
[52] U.S. Cl. .......................... 709/204; 348/15; 370/260
[58] Field of Search ....................... 395/200.34; 709/204; 348/15; 370/260

[56] References Cited

U.S. PATENT DOCUMENTS

| | | | |
|---|---|---|---|
| 4,054,908 | 10/1977 | Poirier et al. ............................. | 348/15 |
| 4,271,479 | 6/1981 | Cheselka et al. ........................ | 345/156 |
| 4,360,827 | 11/1982 | Braun ...................................... | 348/15 |
| 4,529,840 | 7/1985 | Colton et al. ............................ | 348/15 |
| 4,710,917 | 12/1987 | Tompkins et al. ....................... | 709/204 |
| 4,847,829 | 7/1989 | Tompkins et al. ....................... | 370/260 |
| 5,003,532 | 3/1991 | Ashida et al. ............................ | 348/15 |
| 5,014,267 | 5/1991 | Tompkins et al. ....................... | 370/259 |
| 5,315,633 | 5/1994 | Champa .................................. | 348/16 |
| 5,491,797 | 2/1996 | Thompson et al. ...................... | 709/204 |
| 5,509,009 | 4/1996 | Laycock et al. ......................... | 370/259 |
| 5,751,338 | 5/1998 | Ludwig, Jr. .............................. | 348/17 |
| 5,793,415 | 9/1998 | Gregory, III et al. ................... | 348/15 |
| 5,886,734 | 3/1999 | Ozone et al. ............................ | 348/15 |
| 6,081,291 | 6/2000 | Ludwig, Jr. .............................. | 348/16 |

*Primary Examiner*—Kenneth R. Coulter
*Attorney, Agent, or Firm*—Gardner, Carton & Douglas

[57] ABSTRACT

A multi-room video teleconferencing station which uses a single personal computer (PC) to provide video teleconferencing from local or remote locations. Two audio/video heads are attached to the system. A first audio/video head is local to the PC and allows a user to place video teleconference calls from a desktop system in the user's office or from a second audio/video head located at a remote location, such as a conference room. Each audio/video head includes a video display, a camera, a microphone, and a speaker. The second audio/video head allows a user to place a video teleconference call from another room while using the PC in the user's office to perform communications and control functions. The audio/video teleconference function can be disabled at both audio/video heads or selectively activated at either the first or second audio/video head. The second audio/video head has optional data entry capability to allow a user to remotely activate the system. Alternative embodiments use multiple second audio/video heads to provide more extended video teleconferencing capability. Multiple teleconferencing stations can be networked via LANs or servers.

20 Claims, 5 Drawing Sheets

MULTI-HEAD VIDEO TELECONFERENCING STATION

BACKGROUND OF THE INVENTION

1. Technical Field

The present invention relates to video teleconferencing systems. In particular, it relates to video teleconferencing systems in which a single PC base station and network interface dynamically switches between alternative local video teleconferencing locations such that multiple local video teleconferencing locations can communicate with remote video teleconferencing locations using a single system.

2. Background Art

Prior art video teleconferencing systems have provided improved communication capability without the need for actual travel by the participants. Prior art systems typically rely on dedicated stations to provide video teleconferencing information between sites. While prior art systems have reduced the cost of communicating, they are still relatively expensive in that they require substantial hardware and software support at each video teleconferencing station site in order to accomplish their functions.

The prior art has provided several variations which allow a user flexibility in communicating with a remote video conferencing facility. For example, video conferencing systems are known which allow a user at a local video conferencing station to automatically schedule, initiate or monitor video conference calls with remote video conferencing stations. In particular, the prior art has provided interactive systems which can initiate point to point, or broadcast video conferencing connections which can be modified by the user.

In addition to permitting automatic initiation of video teleconference calls, the prior art has also provided video conferencing systems which can dynamically add or delete locations to an active conference. This function allows users to be added or deleted as needed with a minimal demand on their time. Both of the foregoing systems improve total video conference performance, but they do not address efficient use of hardware and software resources at a particular location.

User control at the receiving site has also been enhanced by the prior art. For example, it is known that incoming video conferencing calls can be displayed on the receiving monitor prior to completing the call connection. In effect, this provides a "Caller-ID" function similar to that available on voice telephone systems.

More complex systems have also been developed to control multi-point video conferences. Multi-point video conferencing systems have been developed which use a central controller to control communications between multiple video conferences sites. For example, it is known that a central system can be arranged in a hub format in which the central system connects to each remote video conferencing system.

Systems have also been developed which use video and audio multiplexing to achieve real-time audio and video. Likewise, other convenience features have been developed to improve the quality of video teleconferencing. For example, systems which use voice controlled switching to activate the cameras associated with the loudest audio location have made it easier to focus the attention of the participants on the individual site which is used by the speaker.

As discussed above, a variety of video conferencing systems are known. Video conferencing systems which can be reconfigured at a central location are also known. Central hub systems and switching devices are known which improve intersite communications. Convenience features such as voice activated switching, etc., are known.

However, while the prior art has addressed numerous issues related to the use of intersite video teleconferencing systems, it has failed to address the need to provide improved economy and availability of video teleconferencing a local site. It would be advantageous for users to have the capability of using video teleconferencing at multiple intrasite locations without the excessive expense of redundant systems components. In particular, the prior art has not provided remote video teleconferencing stations which are capable of dynamic switching of local I/O such as cameras, microphones, speakers, keyboards, and mice in different rooms while using a single local PC to control network connection. The use of such a system would allow very inexpensive expansion of the availability of video teleconferencing from several rooms within a particular location by reducing the incremental cost of adding additional rooms.

SUMMARY OF THE INVENTION

The present invention solves the foregoing problems by providing a multi-room video teleconferencing station which uses a single personal computer (PC) to provide video teleconferencing from local or remote locations. Two audio/video heads are attached to the system. A first audio/video head is local to the PC and allows a user to place video teleconference calls from a desktop system in the user's office. A second audio/video head is located at a remote location, such as a conference room, and allows the user to place a video teleconference call from another room while using the PC in the user's office to perform communications and control functions. Each audio/video head includes a video display, a camera, a microphone, and a speaker. The audio/video teleconference function can be disabled at both audio/video heads or selectively activated at either the first or second audio/video head. The second audio/video head has optional data entry capability to allow a user to remotely activate the system. Alternative embodiments use multiple second audio/video heads to provide more extended video teleconferencing capability. Multiple teleconferencing stations can be networked via LANs or servers.

DESCRIPTION OF THE PREFERRED EMBODIMENT

Prior to a discussion of the preferred embodiment shown in the figures, a general discussion of the advantages of the preferred embodiment of the invention follows. The system disclosed herein is multi-head video teleconferencing station capable of interfacing with conventional video teleconferencing terminals.

The invention is designed to add additional teleconferencing outlets in other rooms of an office without requiring the additional cost of another video conferencing terminal. In particular, it allows a user to have private video conferences in the user's office via a first audio/video head attached to the desktop PC in the user's office. In addition, a second remote audio/video head is attached to the desktop PC, but is located in another office such as a conference room. The second audio/video head in the conference room allows video teleconferencing calls to be made in a more public setting, such as a department meeting.

The use of two audio/video heads reduces the overall cost of adding an additional room for teleconferencing since the only additional costs are for the I/O devices required for input and output of audio and video data. The simplest configuration used the PC keyboard to select which audio/video head, if any, is to be activated. In the preferred embodiment, only one audio/video head is active at a time. However, those skilled in the art will recognize that if sufficient processing power and communication line bandwidth is available, both audio/video heads could be configured for simultaneous operation.

An optional remote switching control at the second audio/video head provides the user with the additional convenience of being able to change the audio/video heads' status from active to inactive status or vice versa. The switch can be implemented as a conventional keyboard device, or with other devices such as a touch panel screen.

Figure 1:
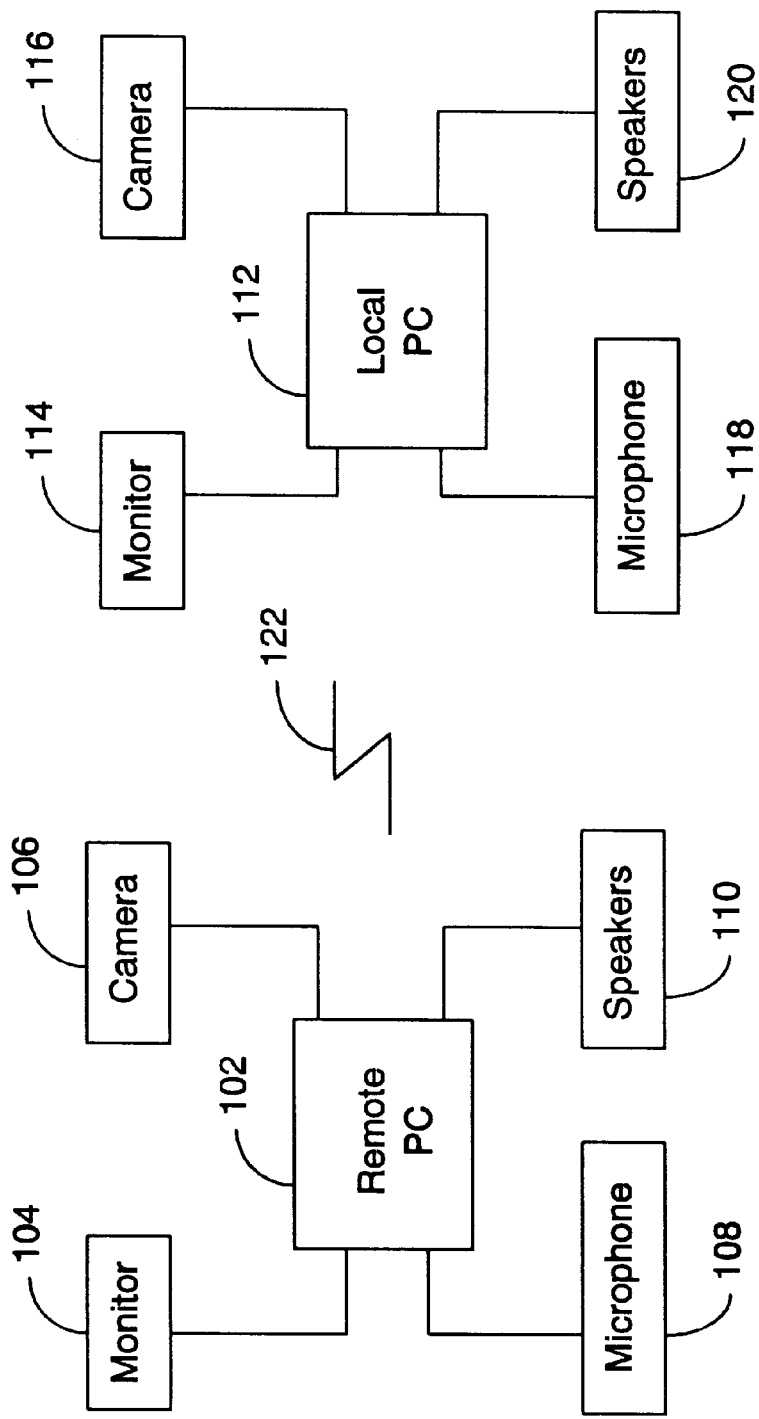
FIG. 1 is a diagram showing a prior art video conference system.

Referring to FIG. 1, a prior art video teleconferencing configuration is shown. A remote PC 102 is shown with the I/O devices required for video teleconferencing, namely a video monitor 104, a camera 106, a microphone 108 and speakers 110. Since the video monitor 104, the microphone 108 and the speakers 110 are typically found on desktop systems, the only additional I/O device required to implement video teleconferencing on such a system would be the video camera 106.

The local PC 112 would be equivalent to the remote PC 102 in that the same I/O devices are required to support video teleconferencing. Local PC 112 is shown with video monitor 114, video camera 116, microphone 118 and speakers 120 attached. Communications line 122 is shown illustrating the communications path between the two systems. Those skilled in the art will recognize that due to the amount of data transferred in video teleconferencing, a high speed communication line will provide better quality audio/video presentation than slower communication lines. In the preferred embodiment ISDN lines are used. For ease of illustration, the ISDN modems and communications circuits, all well known in the art, have been omitted from the figure.

A video teleconferencing call can be placed from either the remote PC 102 or the local PC 112. In addition to the two PCS shown, prior art systems also provide the ability to connect multiple remote PC 102 systems to a local PC 112 for conferencing three or more parties. The disadvantage of this configuration is the amount of system resources required. In particular, each PC 102, 112 is a fully equipped personal computer with dedicated processor, modems, and other I/O. As a result, each time a video conferencing location is added, the expense of an entire PC is added.

Figure 2:
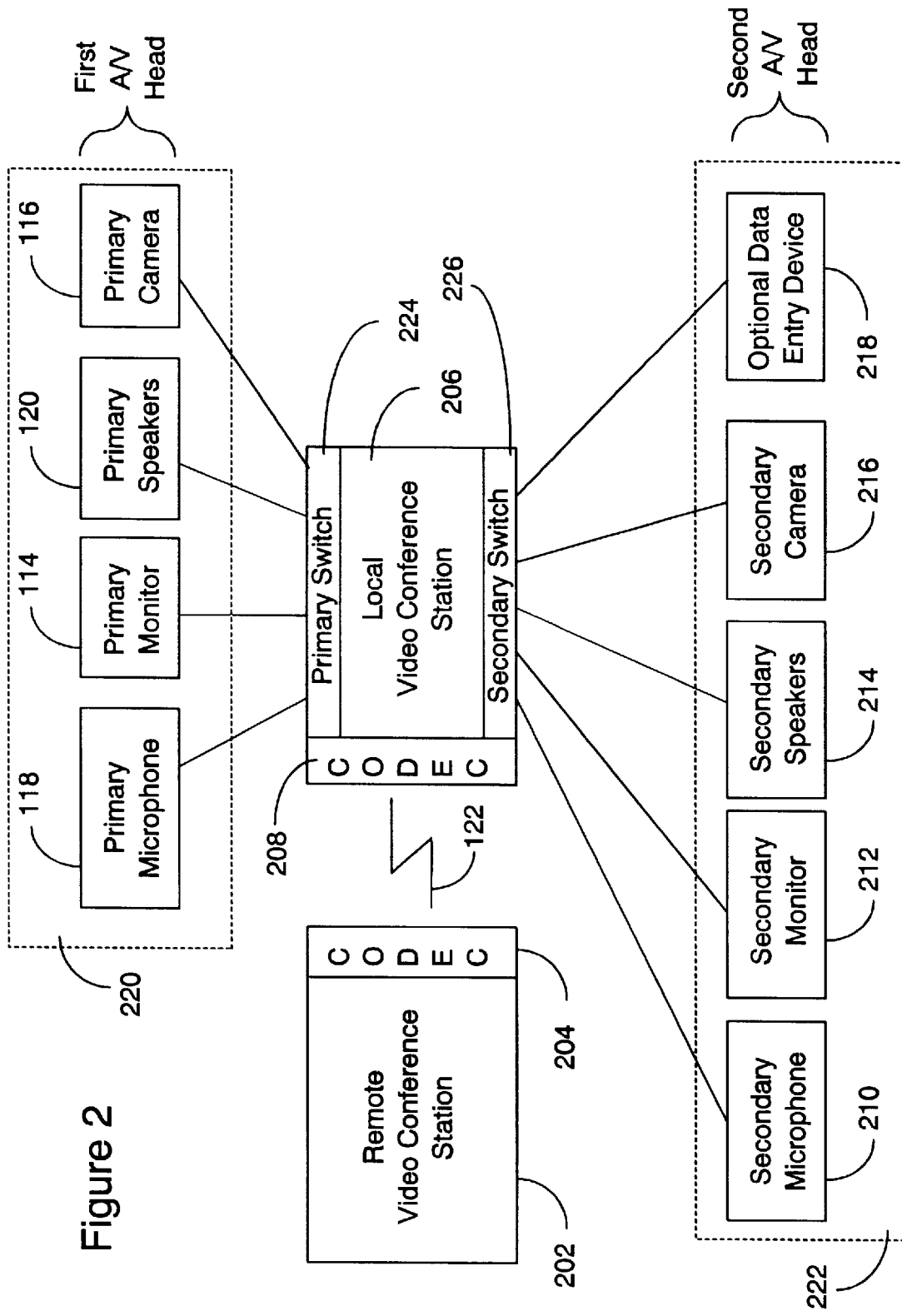
FIG. 2 shows a preferred embodiment of the multi-head video teleconferencing station which has a single remote audio/video head.

FIG. 2 illustrates a preferred embodiment of the invention. The local PC of the prior art is replaced with a local video conference station 206. In the preferred embodiment, local video conference station 206 can be implemented by a commercially available personal computer, for example, a computer based on an Intel (TM) Pentium (TM) or Pentium Pro (TM) processor. Those skilled in the art will recognize that the local video conference station 206 can also be implemented by any suitable processor or as a dedicated hardware device rather than a general purpose computer.

A significant advantage of this configuration over prior art systems is that it does not require a complete system for each video teleconferencing location. A single local video conference station 206 provides access to a communication line 122 by multiple audio/video heads 220, 222. Therefore, the additional of a new video conferencing location can be implemented at minimum expense. In the preferred embodiment, local video conference station 206 is a typical desktop PC. The first A/V head 220 uses the primary speakers 120, the primary microphone 118 and the primary monitor 114 which are part of the standard PC configuration. Their cost is therefore part of the overall system cost and not a dedicated expense of establishing the video conferencing location. The primary camera 116 would most likely be the only additional hardware expense for establishing a video conferencing location where the desktop PC is located.

The second A/V head 222 is also attached to the local video conferencing station 206, but is remotely located from it. For example, while the primary AN head 220 is located in the same room as the desktop PC, the second A/V head 222 may by located in another room such as a conference room. As a result of using multiple AN heads 220, 222, the cost of installing a second video conferencing location in another room is greatly reduced since the cost of the local video conferencing station 206 is avoided as well as the cost of the CODEC or other communications interface which may be used. To implement the second AN head 222, the only additional required equipment is the secondary microphone 210, the secondary monitor 212, the secondary speakers 214 and the secondary camera 216.

In the preferred embodiment only one of the AN heads 220, 222 would be active at any time. The reasons for this are related to system capacity and privacy. Regarding system capacity, each AN head 220, 222 will place a substantial burden on a conventional PC in terms of the amount of data which must be manipulated for video teleconferencing. Therefore, by only allowing one of the A/V heads 220, 222 to be in the active state (i.e., enabled) at a lime, and by placing the other in an inactive state (i.e., disabled), system resource requirements are reduced. Of course, depending on the desktop system's power and capacity, multiple A/V heads can be effectively supported.

Privacy is another issue. By only activating only one AN head 220, 222 at a time, a manager making a video teleconference call from the AN head 220 in the manager's office knows that no one is eavesdropping from the second A/V head 222 in another room.

Also shown in FIG. 2 is the optional data entry device 218. This device is used to remotely enable the secondary AN head 222, thereby creating a convenience for the user by not requiring the user to return to the local video conference station 206 to initiate a call. In the preferred embodiment, the optional data entry device 218 is a conventional keyboard device. However, any data entry device can be used.

For example, a touch panel screen can also be used in place of the keyboard. Keyboard data entry devices and touch panel data entry devices are we known in the art. In addition to providing a convenient method of placing the secondary A/V head 222 in the active state, the data entry device 218 can also be used to limit access to the A/V head 222 by requiring a password to be entered. When the processor in the local video conference station 206 receives the password, then it will activate enable the secondary A/V head 222.

The selected A/V head 220, 222 will be activated by a switch 224, 226. The switch can be either hardware or software. In the preferred embodiment the switch 224, 226 is implemented in software. For ease of illustration, the switch 224, 226 is shown as two separate switches, each controlling a single A/V head 220, 222. However, in practice a single switch would be used to implement the function of switches 224, 226.

Once an A/V head 220, 222 is activated, the local video conference station 206 initiates communication with the remote video conference station 202 via CODECs 204, 208 and communication line 122.

The disadvantage of the prior art is that it is both inflexible and expensive. It is inflexible because video teleconferencing can only be accomplished at one location on a given system. In addition, the prior art is expensive because it is hardware intensive and requires a complete system for each video teleconferencing location. The configuration of the preferred embodiment allows a video teleconferencing location to be set up with a minimum of additional hardware by sharing use of system components by more than one A/V head 220, 222. As a result, a user can easily expand the availability of video teleconferencing locations without the burden of purchasing excess equipment. Another feature of this invention is that it can take advantage of preexisting equipment. For example, it is common to have one or more PCS even at small businesses and in many homes. Since the system is preferably based around a PC, only a small amount of additions equipment is required.

While any number of suitable system architectures can be used to implement the invention, the preferred embodiment envisions the following commercially available components as suitable hardware:

1) Computer Hardware:
   a) Intel (TM) 120 MHZ Pentium (TM) processor
   b) Intel Triton PCI chip set
   c) 16MB RAM, 256KB cache
   d) 1280MB 10Ms IDE HD
   e) 3.5 1.44MB floppy drive
   f) 17 inch monitor
   g) Mid-Tower case
   h) 101 Key keyboard and mouse
   i) ISDN modem
   j) UPS power/power surge protector
2) Video Codec:
   a) Zydacron Z200
3) ISDN Communication Hardware:
   a) Promptus TA
   b) ATT NT (NI2)
4) Camera Interface Controller (CIC):
   a) NTSC or PAL composite video output
   b) Contact closure control inputs
   c) Control and signal cable between PC I/O and CIC
5) System Options:
   a) Multiple BRI/IMUX
   b) Cellular modem connection 6) A/V Switch Interface:
   a) 2 or more control inputs
   b) 2 or more control outputs In addition, the following software is used in the preferred embodiment:

1) PC Software Platform:
   a) Microsoft Windows/95
2) Video Codec Software:
   a) Visual basic
   b) Visual C++
3) Application Level Coding:
   a) Visual C++

Figure 3:
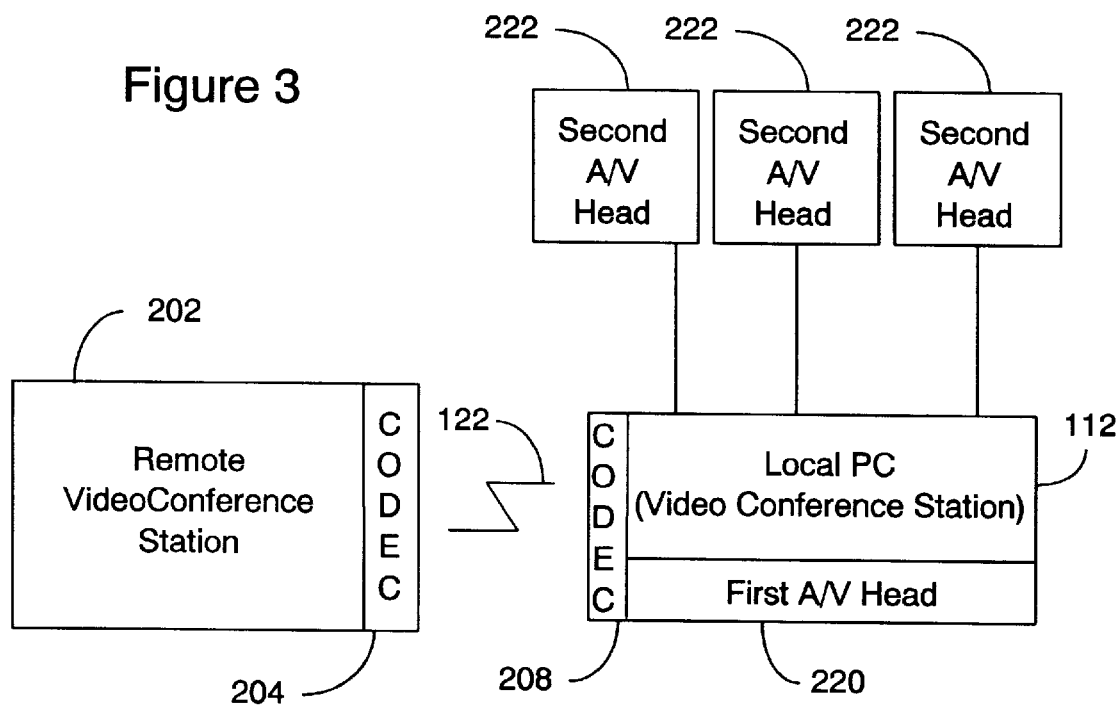
FIG. 3 illustrates an alternative embodiment in which a multi-head video teleconferencing station with multiple remote audio/video heads.

In FIG. 3, an alternative embodiment of the local video conference station 206 is shown. This embodiment uses multiple secondary A/V heads 222 to further expand the number of video conferencing locations which can be supported. For ease of illustration, the first A/V head 220 is shown integrated with the local video conference station 206 and the switches 224, 226 are not shown. Of course, while the number of A/V heads 222 can be expanded, scheduling considerations place a practical limit on the number of A/V heads 222 which can be realistically b supported by a single system.

Figure 4:
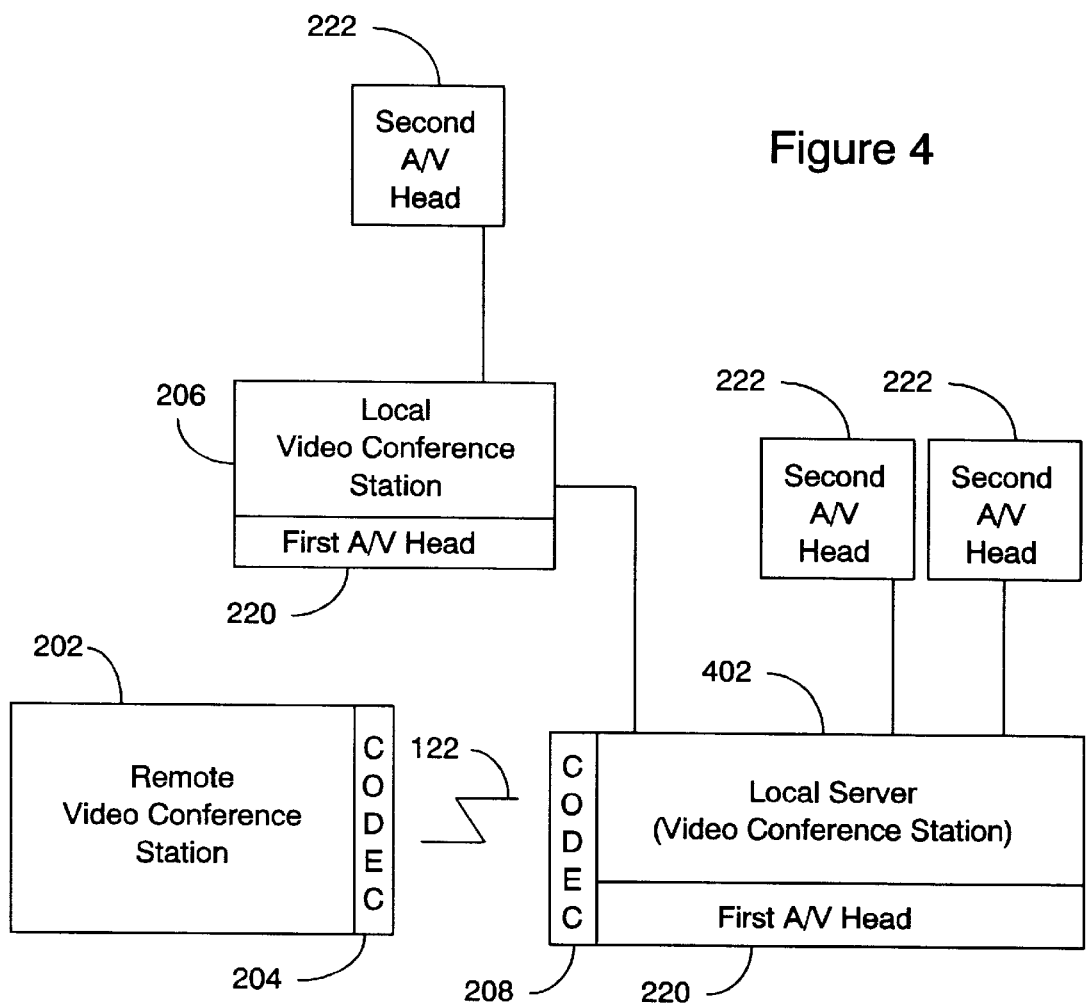
FIG. 4 illustrates an alternative embodiment in which a server provides access to a communications line for multiple multi-head video teleconferencing stations with multiple remote audio/video heads.

In FIG. 4, an alternative embodiment of the local video conference station 206 is illustrated. In this embodiment, a local video conference station 206 is attached to a local server 402. The local server controls communication with the remote video conference station 202. In a larger business environment such as that illustrated here, faster communications lines can be justified by using multiple local video conference stations 206.

The server 402 can also act as a local video conference station as well. In FIG. 4, a single secondary AN head 222 is shown attached to the local video conference station 206 while multiple secondary AN heads 222 are shown attached to the more powerful server 402 system.

Figure 5:
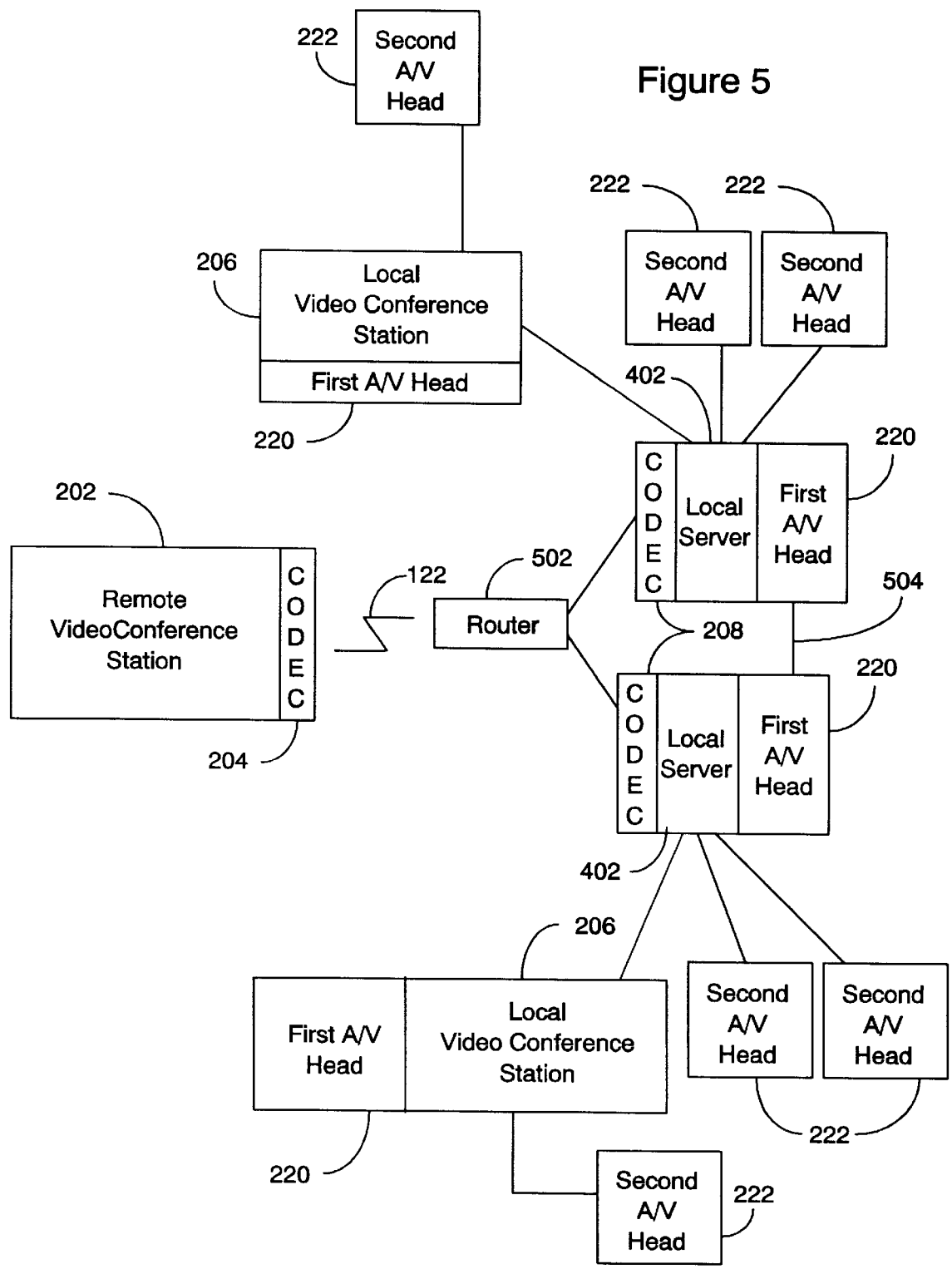
FIG. 5 illustrates an alternative embodiment in which multiple servers communicate directly with one another via a LAN and communicate with a communications line via a router which provides access to a communications line for multiple multi-head video teleconferencing stations with multiple remote audio/video heads.

In FIG. 5, another embodiment is shown which illustrates how the multi-head system can be used in complex environments. This figure illustrates a large multi-server environment in which multiple server systems, similar to those discussed in FIG. 4, are sharing a dedicated high speed line. Each local server 402 operates in the manner described in FIG. 4 in FIG. 4 with the following exceptions. A router 502 controls access to communication line 122 and determines which local server 402 is the proper recipient of incoming data.

In addition, a high speed interserver link 504 (for example, a LAN), provides direct server to server communications. This allows users at a large local site, such as a factory, to use the video teleconferencing capability of the system without using the external communications line 122. The direct connection of LAN systems further provides the user with the ability to perform other functions. For example, an interserver video conferencing system can be used for applications such as in house education for employees, etc.

While the invention has been described with respect to a preferred embodiment thereof, it will be understood by those skilled in the art that various changes in detail my be made therein without departing from the spirit, scope, and teaching of the invention. For example, cellular or land lines can be used by the modems, ISDN lines can be used, the modems can be replaced with non-telephonic transmission mediums, ISDN can be replaced with other suitable network protocols, voice data can be integrated with image data, general purpose computers can be replaced with special purpose hardware, optional data entry devices can vary, the software can be implemented in hardware, etc. Accordingly, the invention herein disclosed is to be limited only as specified in the following claims.

I claim:

1. A video teleconferencing system comprising:
    a single processor comprising:
        communication device for inputting and outputting video and audio data to and from a communications line under control of the processor;
    a first audio/video head comprising:
        a display to display video data received from another video teleconferencing station;
        a video camera for inputting video data;
        a first interface device to output audio data received from another video teleconferencing station; and
        a second interface device for inputting audio data;
        wherein the first audio/video head has an active state and an inactive state;
    at least one second audio/video head, remotely located from the first audio/video head, the second audio/video head comprising:
        a display to display video data received from another video teleconferencing station;
        a video camera for inputting video data;
        a first interface device to output audio data received from another video teleconferencing station; and
        a second interface device for inputting audio data;
        wherein the second audio/video head has an active state and an active state;
    a switch for selectable activation of one of the audio/video heads and deactivation of another audio/video head such that only one audio/video head is active at any time;
    whereby audio/video heads in remote locations from one another can be controlled by the single processor and communicate with a teleconferencing station at a remote location.

2. A video teleconferencing system, as in claim 1, wherein the communications device further comprises a video communications interface.

3. A video teleconferencing system, as in claim 2, wherein the audio/video head switching means further comprises data entry means in the remotely located second audio/video head, the data entry device used to activate or deactivate the remotely located second audio/video head.

4. A video teleconferencing system, as in claim 3, wherein the data entry device is a keyboard.

5. A video teleconferencing system, as in claim 3, wherein the data entry device is a touch panel screen.

6. A video teleconferencing system, as in claim 1, further comprising:
    a plurality of second audio/video heads, remotely located from the first audio video head;
    whereby any second audio/video head can be used as the active audio/video head in a multi-room video teleconferencing station.

7. A video teleconferencing system, as in claim 6, wherein the audio/video head switching means further comprises data entry means in the remotely located second audio/video head, the data entry device used to activate or deactivate the remotely located second audio/video head.

8. A video teleconferencing system, as in claim 7, wherein the data entry device is a keyboard.

9. A video teleconferencing system, as in claim 7, wherein the data entry device is a touch panel screen.

10. A video teleconferencing system, as in claim 1, further comprising:
    a plurality of multi-room video teleconferencing stations; and
    a LAN connecting at the multi-room video teleconferencing;
    whereby each of the multi-room video teleconferencing stations can communicate with any other multi-room video teleconferencing station.

11. A video teleconferencing system, as in claim 10, wherein the audio/video head switching means further comprises data entry means in the remotely located second audio/video head, the data entry device used to activate or deactivate the remotely located second audio/video head.

12. A video teleconferencing system, as in claim 11, wherein the data entry device is a keyboard.

13. A video teleconferencing system, as in claim 11, wherein the data entry device is a touch panel screen.

14. A video teleconferencing system, as in claim 10, wherein one of the multi-room video teleconferencing stations is a server, the server providing the access to the communications line for the multi-room video teleconferencing stations in the video teleconferencing system.

15. A video teleconferencing system, as in claim 10, wherein:
    at least two of the multi-room video teleconferencing stations are servers; and
    a router interfaces between the servers and the communications line, each server capable of communicating with the communications line.

16. A method of using a video conference station for video teleconferencing system from multiple locations with the same processor, including the steps of:
    using a processor to control inputting and outputting video and audio data to and from a communications line under control of the processor;
    using a first audio/video head, having a video display, a video camera., a speaker, and a microphone, to communicate under control of the processor;
    selectively placing the first audio/video head into an active state or an inactive state;
    using at least one second audio/video head, having a video display, a video camera, a speaker, and a microphone, remotely located from the first audio/video head, to communicate under control of the processor;
    selectively placing the second audio/video head into an active state and an active state;
    switching the active and inactive states of the first and second video heads such that no more than one audio/video head is active at any one point in time;
    whereby audio/video heads in remote locations from one another can be controlled by the single processor and communicate with a teleconferencing station at a remote location.

17. A method, as in claim 16, including the further step of using data entry means in the second audio/video head to activate or deactivate the second audio/video head.

18. A method, as in claim 17, including the further step of using a keyboard as the data entry device.

19. A method, as in claim 17, including the further step of using a touch panel screen as the data entry device.

20. A method, as in claim 17, including the further step of using a plurality of second audio/video heads.

* * * * *